(12) United States Patent
Wang et al.

(10) Patent No.: US 11,456,677 B2
(45) Date of Patent: Sep. 27, 2022

(54) POWER CONVERTER PROTECTION CIRCUIT

(71) Applicants: Rolls-Royce Corporation, Indianapolis, IN (US); Rolls-Royce Singapore Pte. Ltd., Singapore (SG)

(72) Inventors: Shaui Wang, Singapore (SG); Chandana Jayampathi Gajanayake, Singapore (SG); Suvajit Mukherjee, Singapore (SG); Souvik Dasgupta, Singapore (SG); David Russell Trawick, Indianapolis, IN (US)

(73) Assignees: Rolls-Royce Corporation, Indianapolis, IN (US); Rolls-Royce Singapore Pte. Ltd., Singapore (SG)

( * ) Notice: Subject to any disclaimer, the term of this patent is extended or adjusted under 35 U.S.C. 154(b) by 6 days.

(21) Appl. No.: 17/117,603

(22) Filed: Dec. 10, 2020

(65) Prior Publication Data

US 2022/0190591 A1 Jun. 16, 2022

(51) Int. Cl.
*H02M 7/217* (2006.01)
*H02H 7/125* (2006.01)
*H02M 7/219* (2006.01)

(52) U.S. Cl.
CPC ........ *H02M 7/2173* (2013.01); *H02H 7/1257* (2013.01); *H02M 7/219* (2013.01)

(58) Field of Classification Search
CPC ... H02M 7/2173; H02M 7/219; H02H 7/1257
See application file for complete search history.

(56) References Cited

U.S. PATENT DOCUMENTS

| | | | |
|---|---|---|---|
| 6,969,959 B2 | 11/2005 | Black et al. | |
| 7,479,756 B2 | 1/2009 | Kasunich et al. | |
| 8,451,637 B1 | 5/2013 | Alexander | |
| 8,964,343 B2 | 2/2015 | Murakami et al. | |
| 9,019,673 B2 | 4/2015 | Varma et al. | |
| 9,197,058 B2 | 11/2015 | Guadiz | |
| 2004/0239272 A1 | 12/2004 | Schulz et al. | |
| 2015/0340859 A1 | 11/2015 | Barker | |

(Continued)

FOREIGN PATENT DOCUMENTS

| | | |
|---|---|---|
| CN | 101895213 A | 11/2010 |
| CN | 102035169 A | 4/2011 |

(Continued)

*Primary Examiner* — Jue Zhang
(74) *Attorney, Agent, or Firm* — Shumaker & Sieffert, P.A.

(57) ABSTRACT

A power conversion system includes a first switch configured to be connected between a first phase of a polyphase alternating current (AC) power source and an electrical load and a first diode configured to be connected between the first phase of the polyphase AC power source and the electrical load, the diode configured to conduct a current from the AC power source to the electrical load. The power conversion system also includes a control unit configured to interface with the first switch to close, responsive to the occurrence of a short circuit fault, the first switch during a negative current portion of the AC cycle of the first phase of the polyphase AC power source and open, responsive to the occurrence of the short circuit fault, the first switch during a positive current portion of the AC cycle of the first phase of the polyphase AC power source.

20 Claims, 9 Drawing Sheets

(56) References Cited

U.S. PATENT DOCUMENTS

| | | | |
|---|---|---|---|
| 2017/0047727 A1* | 2/2017 | Cao | H02M 1/32 |
| 2018/0076734 A1* | 3/2018 | Jimichi | H02M 7/2173 |
| 2019/0067932 A1* | 2/2019 | Li | H02H 3/202 |

FOREIGN PATENT DOCUMENTS

| | | |
|---|---|---|
| CN | 102098030 A | 6/2011 |
| CN | 202167825 U | 3/2012 |
| CN | 105788556 A | 7/2016 |
| CN | 107834516 A | 3/2018 |

\* cited by examiner

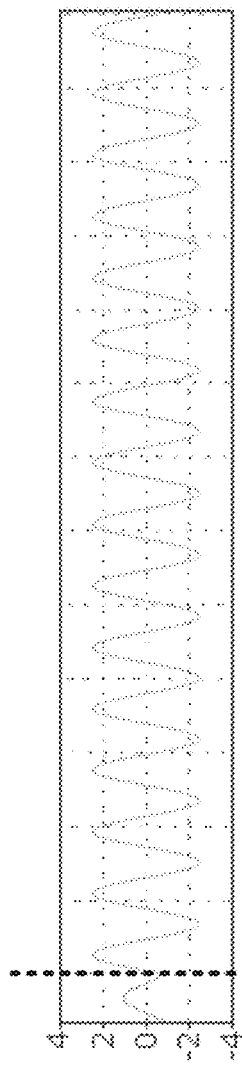
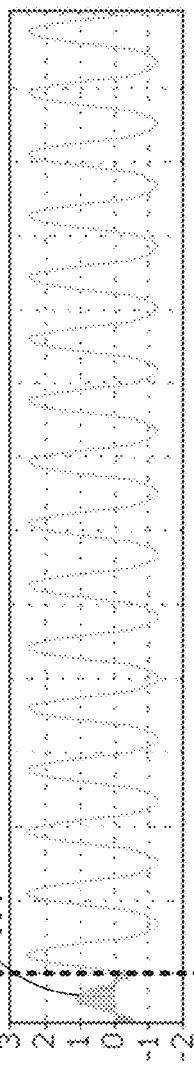
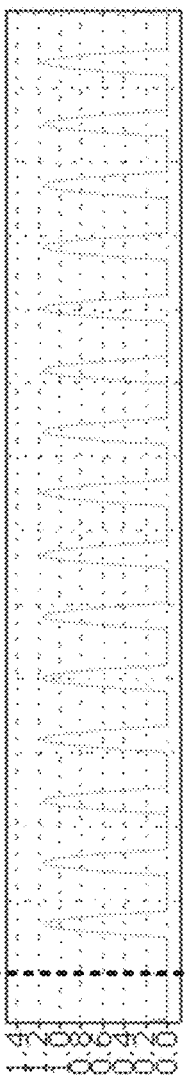
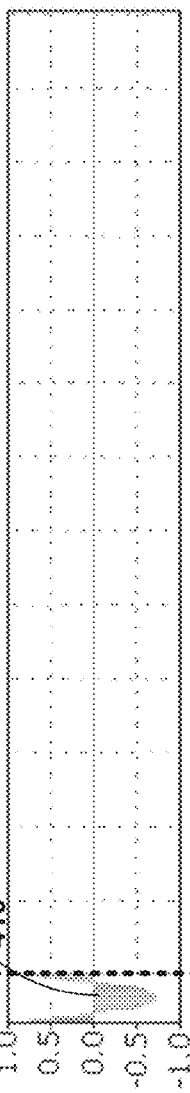
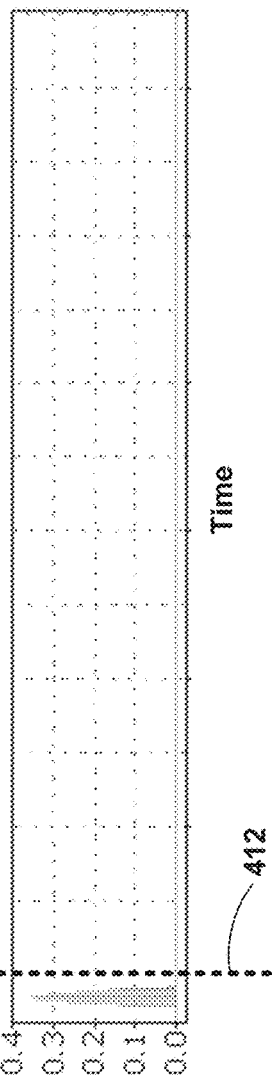

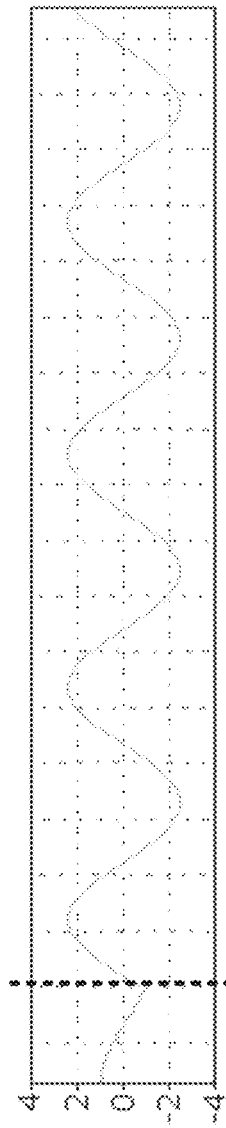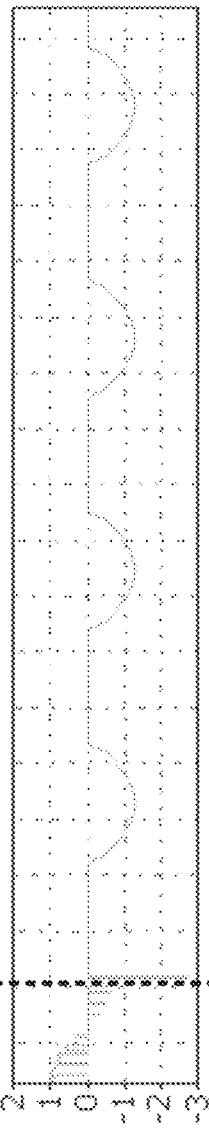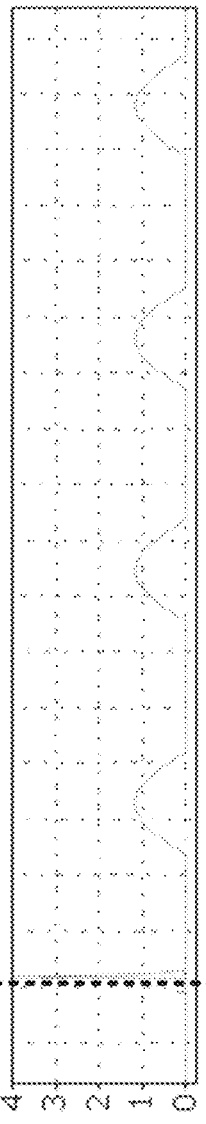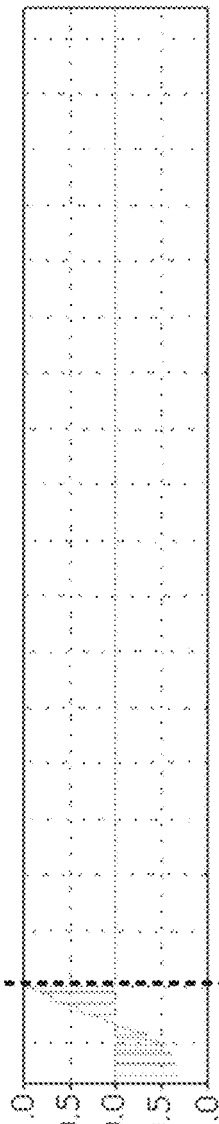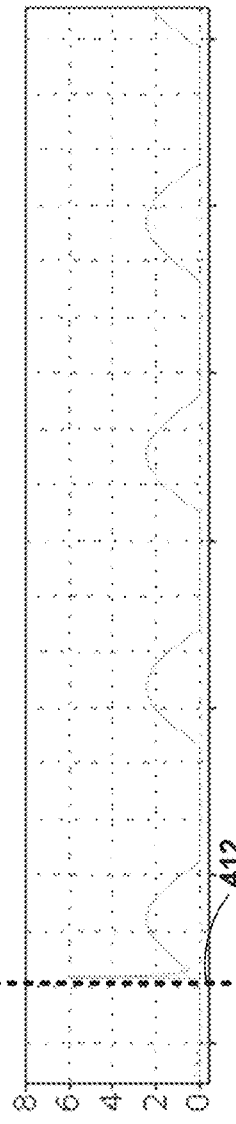

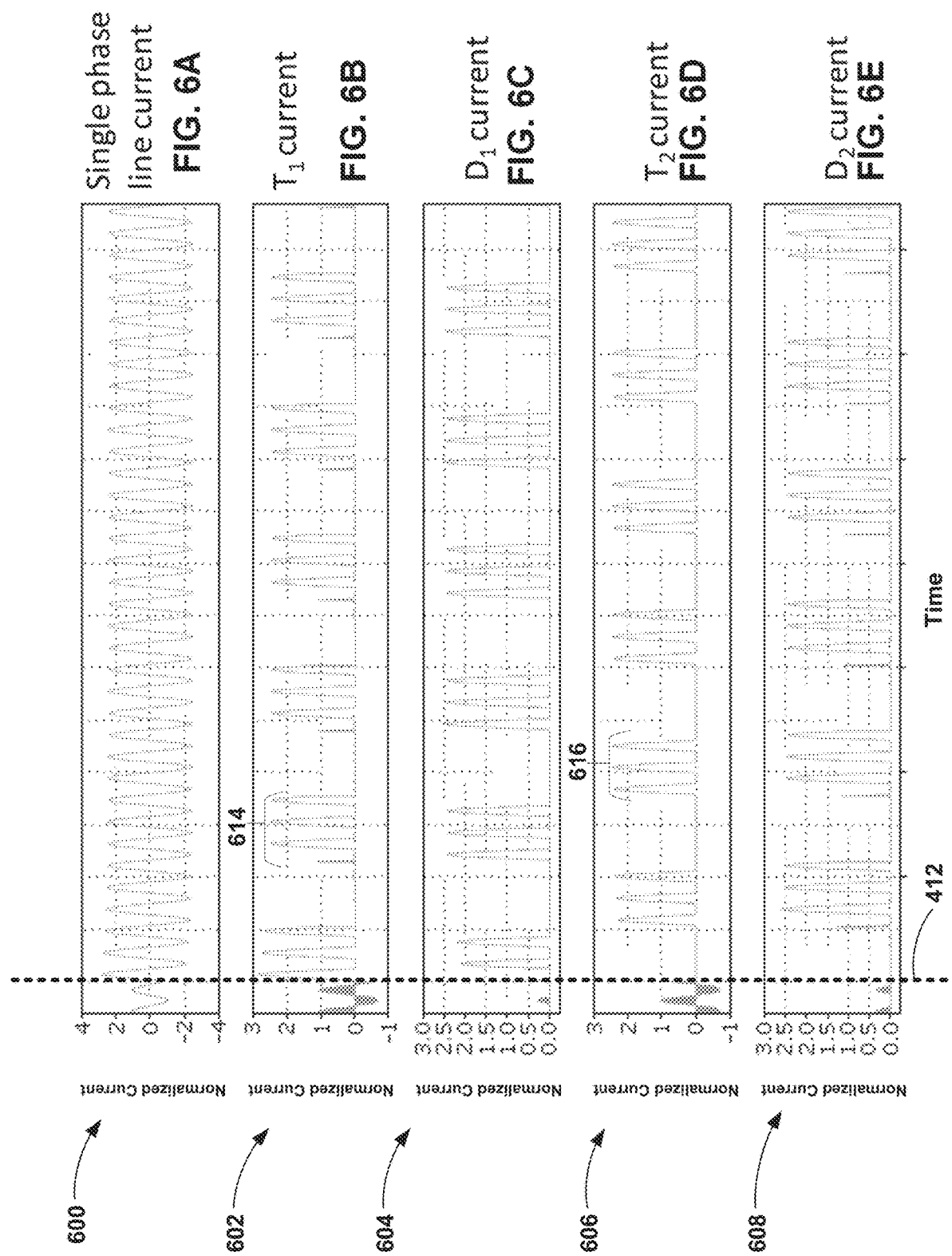

POWER CONVERTER PROTECTION CIRCUIT

TECHNICAL FIELD

The disclosure relates to fault protection for DC power converters.

BACKGROUND

Power converters, such as power converters used in high voltage direct current (HVDC) grids (e.g., found in some hybrid electric aircraft and other applications) may include some form of fault protection, for example, to protect: the power converters, the power grid, or the equipment supplied by the grid, from overvoltage or overcurrent conditions caused by faults. For example, some fault protection systems may cause a power converter to open all of its internal power switches (e.g. insulated gate bipolar transistors (IGBT) or power metal-oxide-semiconductor field-effect transistors (MOSFET)) to cause an open circuit condition within the power converter itself, to prevent damage from a detected fault. High power factor power supplies require the corresponding converters to withstand high fault currents

SUMMARY

In general, the disclosure is directed to techniques and systems for causing an open circuit condition within a power converter (e.g., found in a vehicle system (including military vehicles), aircraft, power grid, or other application) to distribute the open circuit current across multiple power converter components during a fault condition. Unlike other fault protection responses that might open all of the internal switches of the power converter in an attempt to compensate for the fault by providing a low resistance path for current to flow as an alternative to the arcing path causing the fault, an example power converter may instead alternately open some of the internal switches depending on which phase of the power source to which the switch is connected and whether the current cycle is negative or positive. By controlling an example power converter in this way, the power switches may share dissipation of a fault current over a current cycle and also offload dissipation of the fault current to other converter components, such as diodes that may have a higher current rating. With at least some of the fault current being dissipated by multiple components, smaller and lighter components may be used. As such, various aspects of techniques may also enable smaller, lighter, and less costly mechanical contactors for breaking faults at higher voltage and higher currents as well as extend the life of existing mechanical contactor solutions.

In one example, this disclosure describes a power conversion system includes a first switch configured to be connected between a first phase of a polyphase alternating current (AC) power source and an electrical load; a first diode configured to be connected between the first phase of the polyphase AC power source and the electrical load, wherein the diode is configured to conduct a current from the first phase of the polyphase AC power source to the electrical load; and a control unit configured to interface with the first switch to close, responsive to the occurrence of a short circuit fault, the first switch during a negative current portion of the AC cycle of the first phase of the polyphase AC power source and open, responsive to the occurrence of the short circuit fault, the first switch during a positive current portion of the AC cycle of the first phase of the polyphase AC power source.

In another example, this disclosure describes a method of protecting a power conversion system during a short circuit fault includes closing, via a control unit and in response to the short circuit, a first switch connected to a first phase of a polyphase alternating current (AC) power source during a negative current portion of an AC cycle of the first phase of the polyphase AC power source; and opening, via the control unit and in response to the short circuit, the first switch during a positive current portion of the AC cycle of the first phase of the polyphase AC power source.

In another example, this disclosure describes a direct current (DC) distribution system includes a first power conversion system includes a first alternating current (AC) power source; a first set of switches configured to be connected between the first AC power source and a DC distribution bus; a first set of diodes configured to be connected between the first AC power source and the DC distribution bus, wherein the diode is configured to conduct a current from the first AC power source to the DC distribution bus; and a first control unit configured to interface with the first set of switches to close, responsive to the occurrence of a short circuit fault, the first set of switches during a negative current portion of an AC cycle of the first AC power source and open, responsive to the occurrence of the short circuit fault, the first set of switches during a positive current portion of the AC cycle of the first AC power source; and a second power conversion system includes a second alternating current (AC) power source; a second set of switches configured to be connected between the second AC power source and the DC distribution bus; a second set of diodes configured to be connected between the second AC power source and the DC distribution bus, wherein the diode is configured to conduct a current from the second AC power source to the DC distribution bus; and a second control unit configured to interface with the second set of switches to open and close the second set of switches.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a plot illustrating example single phase line current of an AC/DC power converter during a fault condition.

FIG. 4B is a plot illustrating example current flowing through a component of an AC/DC power converter during a fault condition.

FIG. 4C is a plot illustrating example current flowing through a component of an AC/DC power converter during a fault condition.

FIG. 4D is a plot illustrating example current flowing through a component of an AC/DC power converter during a fault condition.

FIG. 4E is a plot illustrating example current flowing through a component of an AC/DC power converter during a fault condition.

FIG. 5A is a plot illustrating example single phase line current of an AC/DC power converter during a fault condition.

FIG. 5B is a plot illustrating example current flowing through components of an AC/DC power converter during a fault condition with converter switches alternately opened and closed, in accordance with techniques of this disclosure.

FIG. 5C is a plot illustrating example current flowing through components of an AC/DC power converter during a fault condition with converter switches alternately opened and closed, in accordance with techniques of this disclosure.

FIG. 5D is a plot illustrating example current flowing through components of an AC/DC power converter during a fault condition with converter switches alternately opened and closed, in accordance with techniques of this disclosure.

FIG. 5E is a plot illustrating example current flowing through components of an AC/DC power converter during a fault condition with converter switches alternately opened and closed, in accordance with techniques of this disclosure.

FIG. 6A is a plot illustrating example single phase line current of an AC/DC power converter during a fault condition.

FIG. 6B is a plot illustrating example current flowing through components of an AC/DC power converter during a fault condition with groups of converter switches alternately opened and closed, in accordance with techniques of this disclosure.

FIG. 6C is a plot illustrating example current flowing through components of an AC/DC power converter during a fault condition with groups of converter switches alternately opened and closed, in accordance with techniques of this disclosure.

FIG. 6D is a plot illustrating example current flowing through components of an AC/DC power converter during a fault condition with groups of converter switches alternately opened and closed, in accordance with techniques of this disclosure.

FIG. 6E is a plot illustrating example current flowing through components of an AC/DC power converter during a fault condition with groups of converter switches alternately opened and closed, in accordance with techniques of this disclosure.

DETAILED DESCRIPTION

In general, the disclosure is directed to techniques and systems for dynamically causing an open circuit condition within a power converter (e.g., found in a vehicle system (including a military vehicle system), aircraft, power grid, or other application) to distribute the open circuit current across multiple power converter components during a fault condition. Power converters are often oversized in order to tolerate the fault current, and the techniques disclosed may enable a power converter to utilize components with a reduced size and fault tolerance.

The design of surface permanent magnet machines, including both motors and power sources such as generators, may include a tradeoff between power factor and symmetrical fault current. A machine designed with a high power factor to meet a high power density target may also be designed to withstand high fault current. For example, a machine with a power factor higher than 90% may be susceptible to a fault current that is twice its output current, or greater.

To manage a direct current (DC) side short circuit fault, a conventional approach is to close all of the high-side switches or all of the low-side switches of the power converter so that all phase currents conduct through the low impedance power switches instead of the arcing path causing the fault, similar to a so-called "crowbar" concept in which a theoretical crowbar is placed upon the output terminals of the power supply to in effect provide a low resistance path for current to flow as an alternative to the arcing path causing the fault. Because the power switches have lower impedances, the current will flow through the alternative path and the fault current will be reduced.

Unlike a conventional crowbar that closes all of the high-side switches or all of the low-side switches to redirect the fault current through the low resistance path provided by the closed switches, various aspects of the techniques described may enable an example power converter to share dissipation of a fault current over a current cycle and among converter components other than the switches, such as diodes that may have a higher current rating. With at least some of a fault current being dissipated by multiple components, smaller and lighter components, e.g., switches, may be used. The systems and methods disclosed may also enable smaller, lighter, and less costly mechanical contactors for breaking faults at higher voltage and higher currents as well as extend the life of existing mechanical contactor solutions.

Figure 1:
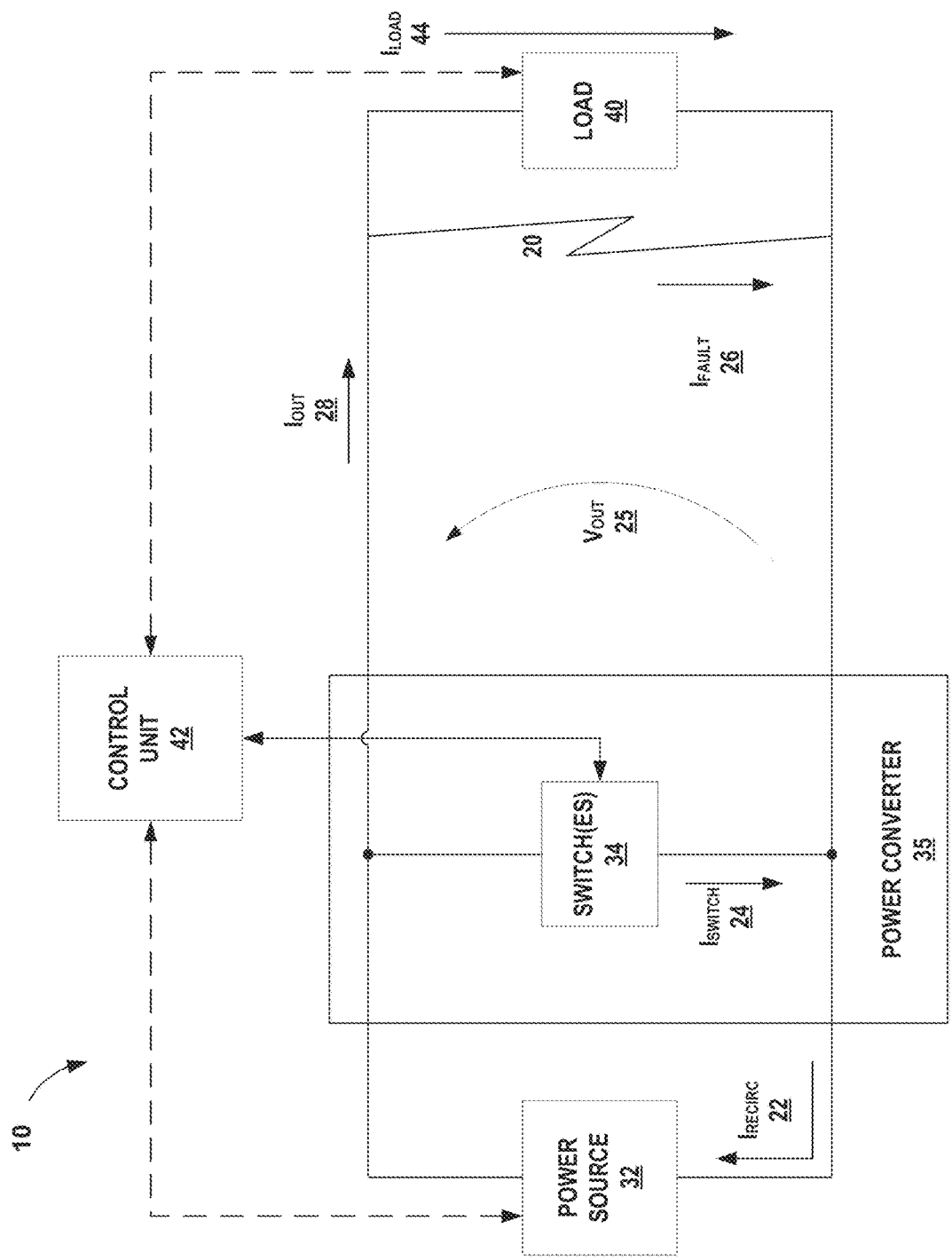
FIG. 1 is a block diagram illustrating an example electrical system configured to implement fault protection, in accordance with techniques of this disclosure.

FIG. 1 is a block diagram illustrating an example electrical system configured to implement fault protection, in accordance with techniques of this disclosure. In some examples, electrical system 10 (referred to simply as "system 10") may form part of a manned or unmanned vehicle system, such as an electrical system of an automobile or aircraft. In other examples, system 10 may be part of a high voltage (HV) power grid, such as a HVDC power grid, which may part of a vehicle system. In some examples, the meaning of the term "high voltage" may vary from industry to industry. For example, "high voltage" in the aerospace industry may include systems that operate above 540V. Whereas for terrestrial power grids, low voltage dc (LVDC) may be defined as voltage less than 1000V (i.e. one kV), while medium voltage DC (MVDC) may be considered for systems that operate with voltages between 1 kV and 100 kV. The techniques of this disclosure may apply to systems considered HVDC, LVDC and MVDC. This disclosure uses the term HVDC systems to simplify the explanation.

Electrical system 10 includes: power source 32, load 40, control unit 42 and power converter 35, which may include switches 34.

Power source 32 supplies power to electrical system 10 and load 40, e.g. Iout 28. Power source 32 may represent an AC power source and power converter 35 may convert AC power from power source 32 to DC power, e.g., for use by load 40. Examples of power source 32 as an AC power source may include an AC generator, such as powered by a gas turbine or other motor. An AC generator may be a single phase or multiple phase generator, such as a three-phase generator.

Load 40 may include any type of load that uses DC power. In some examples, load 40 may include an HVDC power grid, which supplies a variety of other loads. Some examples of other loads include equipment such as avionics, e.g. weather radar, navigation equipment, and communication equipment, lighting, food preparation appliances, pumps, and similar equipment. The equipment may include, or be served by, other power converters to change the voltage on the HVDC grid to the voltage type and level used by the equipment. For example, a compartment light may run on 12 V DC and the output of power converter 35 may supply 200 V DC. The compartment light may include a DC/DC power converter to reduce the 200 V DC to the 12 V DC needed to run the compartment light.

Control unit 42 controls the components of electrical system 10 to cause electrical system 10 to distribute electrical power to load 40. Control unit 42 may send and receive signals to and from power converter 35 and in some cases, power source 32 and load 40. In some examples, load 40 may send signals to control unit 42 to increase or decrease the power output to load 40. Control unit 42 may be located anywhere such that control unit 42 can communicate with the components of electrical system 10. For example, control unit 42 may be integrated with power converter 35, part of power source 32, or part of other circuitry that controls and monitors an aircraft or other vehicle in which electrical system 10 is installed.

Control unit 42 may include one or more processors and a memory. Examples of processor in control unit 42 may include any one or more of a microcontroller (MCU), e.g. a computer on a single integrated circuit containing a processor core, memory, and programmable input/output peripherals, a microprocessor (µP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Control unit 42 may be operatively connected to switches 34. Control unit 42 may receive signals from switches 34 and send control signals to switches 34. For example, control unit 42 may receive an indication of the state of the one or more switches in switches 34, such as whether a switch is open, and not conducting current, or a switch is closed, and conducting current. Control unit 42 may also monitor the output voltage ($V_{OUT}$) 25 and current ($I_{OUT}$) 28 from power converter 35 via voltage and current sensors (not shown in FIG. 1).

Power converter 35 converts power supplied by power source 32 according to the requirements of load 40. Examples of power converter 35 include an AC/DC converter, a DC/DC converter, or any other type of power converter with one or more switches that can be controlled during a fault to dissipate at least a portion of fault current 26.

Power converter 35 may include one or more switches 34. Switches 34 are controlled by control unit 42 to convert input power from power source 32 to an output power that is delivered to load 40. Switches 34 may include one or more pairs of high-side and low-side switches used to convert an AC power from power source 32 to a DC power at a predetermined output voltage and current to be used by load 40. In some examples, switches 34 may include one or more energy absorption devices. Some examples of energy absorption devices may include a metal oxide varistor (MOV) or a transient voltage suppression (TVS) diode.

In some examples, system 10 may be subject to a fault, such as line-to-line fault 20. Fault 20 may cause fault current $I_{FAULT}$ 26 to bypass load 40 and at least partially reduce the load current, LOAD 44. Fault 20 may be caused by a short circuit in a piece of equipment connected to an HVDC power grid, a fault within power converter 25, a fault in the wiring that supplies the loads in load 40, such as an insulation failure between the power and ground lines, or by some other cause. Fault 20 may result in a fault current, depicted by $I_{FAULT}$ 26. $I_{FAULT}$ 26 may bypass portions of load 40, depending on the location of fault 20. Under normal operating conditions, current from power converter 35 passes through load 40, as indicated by $I_{LOAD}$ 44.

In normal operation (i.e., when no fault conditions exist at electrical system 10), electrical system 10 may receive power from power source 32, convert the power to a predetermined voltage and current, and supply the converted power to load 40. For example, control unit 42 may send control signals to power switches 34 that cause power switches 34 to open and close in a particular way for converting the power being output by power source 32 into power with a voltage, a current, and frequency required by load 40.

However, during a fault condition, control unit 42 may receive an indication of the fault condition. For example, control unit 42 may receive e.g., from a current sensor not shown in FIG. 1, an indication of a current level flowing out of power converter 35. Control unit 42 may determine that the current level represents a fault condition, e.g. fault 20, such as by determining that the current level exceeds a predetermined acceptable current level (or, in other words, a current level threshold) associated with power converter 35.

In response to detecting fault 20 according to conventional crowbar approaches, control unit 42 may close all of control switches 34 to reduce an amount of fault current $I_{FAULT}$ 26 associated with fault condition 20 during substantially the entire time of fault condition 20 in order to prevent damage from fault condition 20. Opening all of control switches 34 provides a low resistance path for current to flow because the power switches have lower impedances than the fault path. However, the distribution of the current flowing through components of power converter 35, e.g., switches 34, during vault condition 20 is not even, and at least some, or all, of switches 34 may be over-sized to conduct the "worst case" current levels during fault condition 20 to prevent exceeding the safety junction temperatures of the components, namely, switches 34.

In accordance with various aspects of the techniques described in this disclosure, control unit 42 may, in response to detecting fault 20, reconfigure components of electrical system 10 to prevent fault 20 from damaging electrical system 10. In particular, control unit 42 may control switches 34 to reduce an amount of fault current $I_{FAULT}$ 26 associated with fault condition 20.

To prevent damage from fault condition 20, control unit 42 may alternately open and close at least one switch of switches 34 during each current cycle. For example, control unit 42 may close a switch of switches 34 during a negative portion of the current cycle of the phase to which the switch is connected, and control unit 42 may open the switch during a positive portion of the current cycle. By closing the switch during a negative portion of each current cycle, control unit 42 may cause at least a portion of the fault current to flow through the switch and recirculate through power source 32 as $I_{RECIRC}$ 22, rather than exit power converter 35 towards load 40. In other words, by closing at least one switch and allowing a portion of the fault current to recirculate back through power source 32, control unit 42 reduces the magnitude of the remaining fault current flowing as $I_{OUT}$ 28. By opening the switch during a positive portion of each current cycle, control unit 42 may cause the current to flow through other components of power converter 35 thereby reducing stress on the switch, at least during that portion of the current cycle.

In some examples, control unit 42 may control the operation switches 34, for example by controlling the gate of a MOSFET or an IGBT. In examples in which control unit 42 controls the operation of one or more of switches 34, control unit 42 may verify the state of each of switches 34, e.g. open or closed, by determining the state of the signal controlling the gate of each of switches 34. In other examples, control unit 42 may receive signals from a current sensor in the path of one or more of switches 34. Some examples of a current sensor for a switch may include a shunt resistor, or a signal from a switch that includes current sensing capability, such as a current sensing MOSFET. Control unit 42 may verify the state of each of switches 34 by determining whether current is flowing in the path of each of switches 34. In other examples, power converter 35 may send a signal to control unit 42 about the state of one or more of switches 34. Control unit 42 may verify that one or more of switches 34 is conducting a portion of the fault current based on the signal from power converter 35.

In this manner system 10 may provide advantages over other types of fault protection systems that may close all of the internal switches of the power converter in an attempt to isolate the fault. For example, a fault current may be more than twice, three times, four times, or more, than the rated current for the power supply. An example electrical system that uses the described techniques may reduce the fault current while distributing the fault current over converter 35 components more evenly, and thereby enabling the use of less sophisticated, less costly, smaller, or lighter converter 35 components.

In other words, the combination of turning on (e.g., closing) some of the switches in the power converter at certain times during the AC cycle of the respective phases of the power source and distributing the energy caused by the fault condition may result in reducing the amount of energy each of the components, such as switches 34, need to be capable of absorbing. Therefore, converter 35 may use smaller, lighter, less costly, and lower rated MOSFETS, for example. The fault protection control scheme may provide several advantages over other techniques of fault protection. Some advantages may include improved reliability and reduced cost and weight when compared to other techniques. Improved reliability and reduced weight may be desirable in power systems on aircraft, including unmanned aerial systems (UAS) or other vehicles.

Electrical system 10 may include one or more protection devices (not shown in FIG. 1) that protect electrical system 10 from faults, such as fault 20, by breaking fault current ($I_{FAULT}$) 26. The protection devices may include any type of device configured to disconnect a power supply from a load in the event of an overvoltage, overcurrent or other types of faults. Some examples of protection devices include a fuse, a solid state circuit breakers (SSCB), hybrid circuit breaker (HCB)s and fast mechanical disconnect (FMD). The protection devices may be configured to create an open circuit to break fault current $I_{FAULT}$ 26 and prevent fault current $I_{FAULT}$ 26 from damaging electrical system 10, for example, if a fault cannot be cleared by recirculating the current to power source 32 alone.

Figure 2:
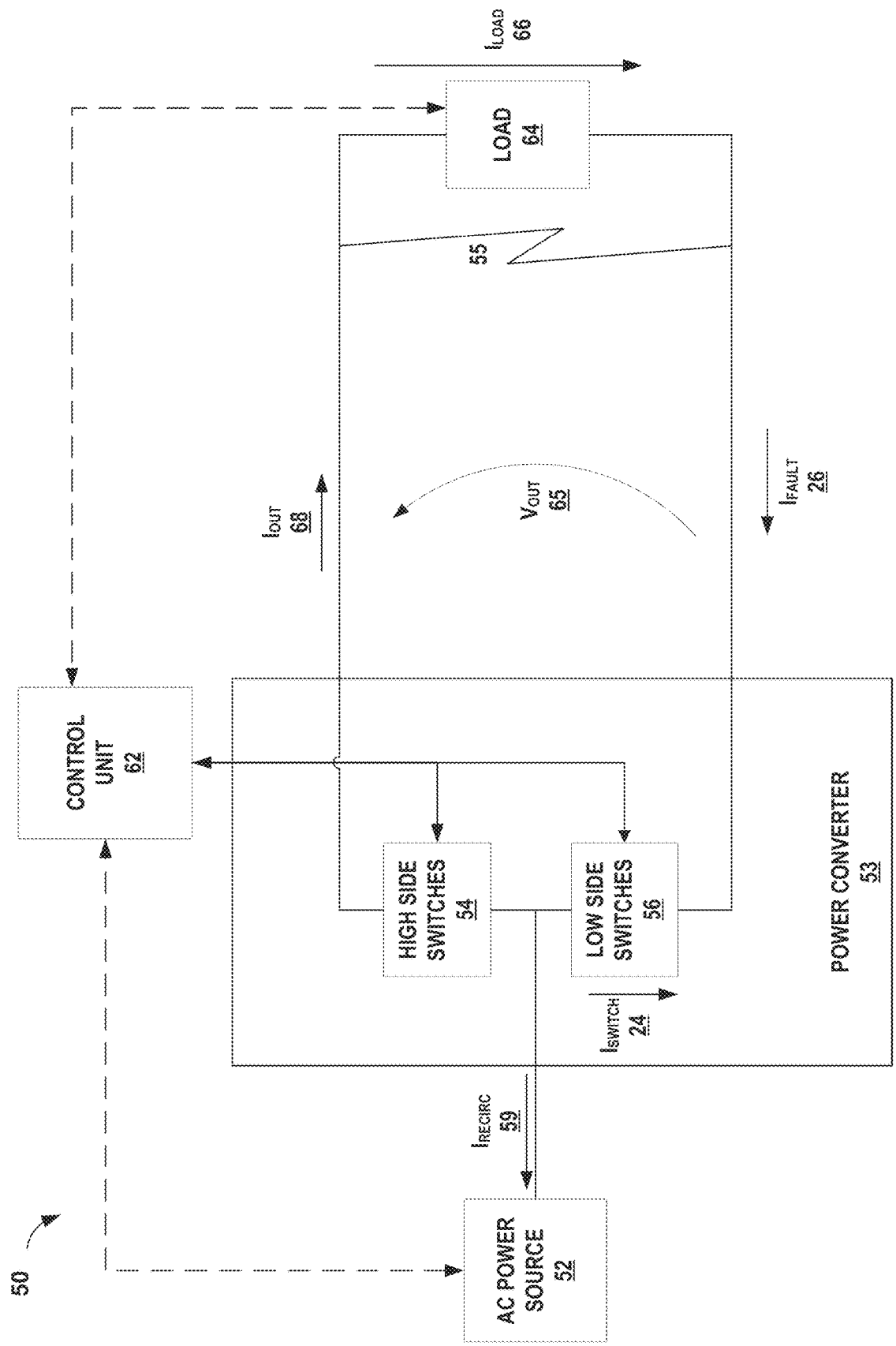
FIG. 2 is a block diagram illustrating an example electrical system with an AC/DC power converter configured to implement fault protection, in accordance with techniques of this disclosure.

FIG. 2 is a block diagram illustrating an example electrical system with an AC/DC power converter configured to implement fault protection, in accordance with techniques of this disclosure. Electrical system 50 depicted in FIG. 2 is an example of system 10 described above in relation to FIG. 1.

Electrical system 50 (referred to simply as "system 50") includes: power source 52, load 64, control unit 62 and power converter 53, which may include high-side switches 54 and low-side switches 56. Power source 52, load 64, control unit 62, and power converter 53, are, respectively, examples of power source 32, load 40, control unit 42, and power converter 35 of FIG. 1. As such, the characteristics and functions of power source 52, protection device 60, load 64, control unit 62, and power converter 53 may be similar or the same as the characteristics and functions of, respectively, power source 32, load 40, control unit 42, and power converter 35 of FIG. 1

In some examples, system 50 may be subject to a fault, such as line-to-line fault 55. As with fault 20 described above in relation to FIG. 1, fault 55 may cause fault current, $I_{FAULT}$ 26 to bypass load 64 and at least partially reduce the load current, $I_{LOAD}$ 66.

AC power source 52 supplies power to electrical system 50 and load 64, e.g. Iout 68. Examples of AC power source 52 include a single phase or multiple phase generator. Similar to load 40 of FIG. 1, load 64 may include any type of load that uses DC power including an HVDC power grid.

Control unit 62 may control at least some of the components of electrical system 50. Control unit 62 may send and receive signals to and from power converter 53, and in some cases, AC power source 52 and load 64.

Power converter 53 converts power supplied by AC power source 52 according to the requirements of load 64. Power converter 53 is an AC/DC power converter which rectifies and conditions the AC power to a DC output power (i.e. output voltage, $V_{OUT}$ 65, and output current, $I_{OUT}$ 68). In some examples, such as for a vehicle power system, system 50 may supply DC output power at high voltages, e.g. in the hundreds of volts or for low voltages, or a 12V or 24V system such as for an automobile. For some applications a high voltage system, such as an HVDC grid may have advantages compared to lower voltage systems, such as a 12 volt DC system. For example, higher voltage systems may use a reduced cable weight when compared to low voltage systems. Also, the electrical converter architecture for converters inside individual loads on the HVDC grid may be built lighter when using, for example a +/−270 V DC supply. In the example of an aircraft, a traditional auxiliary power unit (APU) may be replaced by a multifunctional fuel cell system, which may reduce pollution during ground operation.

Some examples of AC/DC power converters, such as power converter 53 depicted in FIG. 2, may include high-side switches 54 and low-side switches 56 to rectify and control the output power of power converter 53. In the example of system 50, control unit 62 may include current or voltage sensing capability to monitor the output power of power converter 53 and adjust the switching duty cycle and frequency of high-side switches 54 and low-side switches 56 to maintain the desired output voltage 65 and output current 68.

Power converter 53 may include one or more filters (not shown) that, when combined with high-side switches 54 and low-side switches 56, convert input power from AC power source 52 to the desired DC output voltage and current. Such filters may include components arranged to increase the AC output voltage from AC power source 52 to a higher DC output voltage 65. In other examples, such filters may include components arranged to decrease the AC output voltage from AC power source 52 to a lower DC output voltage 65.

Similar to described above for system 10 in FIG. 1, during normal operation (i.e., no fault conditions exist at electrical system 50), electrical system 50 may receive power from AC power source 52, convert the AC power to a predetermined DC voltage and current, and supply the converted power to load 64. Control unit 62 may receive signals from components (not shown in FIG. 2) that monitor the operation of system 50, such as output current 68 and output voltage 65.

During a fault condition, control unit 62 may receive an indication of the fault condition, e.g. fault 55, based on, for example, detecting an overcurrent condition in system 50. In response, control unit 62 may alternately close at least one switch of high-side switches 54 and at least one switch of low-side switches 56. For example, control unit 42 may close a switch of high-side switches 54 for a first period of time, e.g., one or more current cycles while opening all of low-side switches 56. After the first period of time, control unit 42 may then open all of the switches of high-side switches 54 while closing at least one switch of low-side switches 56 for a second period of time, e.g., one or more current cycles. As described above in relation to FIG. 1, closing at least one switch of either high-side switches 54 or low-side switches 56, control unit 62 may cause at least a portion of the fault current to flow through the switch and recirculate through power source 52 as $I_{RECIRC}$ 59, rather than exit power converter 53 towards load 64. By alternately closing at least one switch of high-side switches 54 while all of low-side switches are open and closing at least one switch of low-side switches 56 while all of high-side switches 54 are open during different time periods, control unit 62 may distribute the current to flow through the components of power converter 53 more evenly over a period of time, e.g., the first time period plus the second time period, thereby reducing stress on individual components of power converter 53 during that portion of time.

In some examples, control unit 62 may control the operation of each switch of high-side switches 54 and low-side switches 34, for example by controlling the gate of a MOSFET or an IGBT. For example, control unit 62 may verify the state of each switch, e.g. open or closed, by determining the state of the signal controlling the gate of the switch. In other examples, control unit 62 may receive signals from a current sensor in the path of a switch. Some examples of a current sensor for a switch may include a shunt resistor, or a signal from a switch that includes current sensing capability, such as a current sensing MOSFET. Control unit 62 may verify the state of each switch by determining whether current is flowing in the path of the switch. In other examples, power converter 53 may send a signal to control unit 62 about the state of a switch of high-side switches 54 and/or low-side switches 56. Control unit 62 may verify that at least one switch of high-side switches 54 and/or low-side switches is conducting a portion of the fault current based on the signal from power converter 53.

In this manner system 50 may provide advantages over other types of fault protection systems that may close all of the internal switches of the power converter in an attempt to isolate the fault. For example, a fault current may not appreciably flow through low-side switches 56 in a fault protection systems that may close all of the internal switches of the power converter. By contrast, an example electrical system that uses the described techniques may reduce the fault current while distributing the fault current over converter 53 components more evenly, e.g., by forcing fault current to flow through some components during a first period of time and to flow through other components during a second, and different, period of time. As such, system 50 may enable the use of less sophisticated, less costly, smaller, or lighter converter 53 components, such as lower rated MOSFETS. The fault protection control scheme of system 50 may provide several advantages over other techniques of fault protection, including improved reliability and reduced cost and weight when compared to other techniques.

Figure 3:
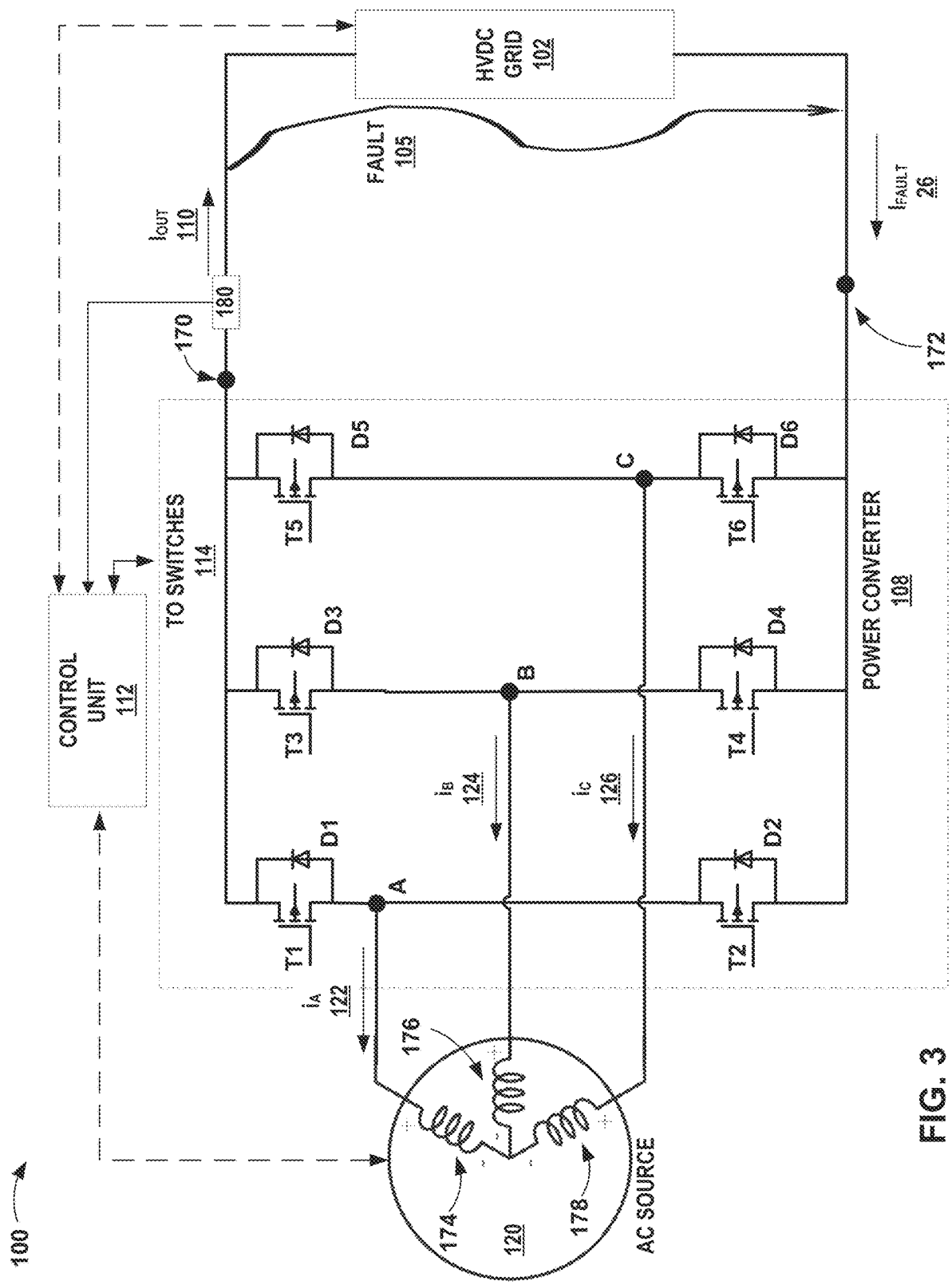
FIG. 3 is a block diagram illustrating an additional example electrical system with an AC/DC power converter configured to implement fault protection, in accordance with techniques of this disclosure.

FIG. 3 is a block diagram illustrating an additional example electrical system 100 with an AC/DC power converter configured to implement fault protection in accordance with techniques of this disclosure. Electrical system 100 (referred to as system 100) operates in a similar manner to systems 10 and 50 described above in relation to FIGS. 1 and 2. System 100 is just one possible example implementation of an AC/DC power converter circuit supplying a load. In other examples, AC/DC power converters may include different components and configurations and remain within the scope of this disclosure.

System 100 includes: AC power source 120, HVDC grid 102, control unit 112 and power converter 108, which may include switches T1-T6. AC power source 120, HVDC grid 102, control unit 112, and power converter 108, are, respectively, examples of power sources 32 and/or 52, loads 40 and/or 64, control units 42 and/or 62, and power converters 35 and/or 53 of FIGS. 1-2. As such, the characteristics and functions of AC power source 120, protection device 104, HVDC grid 102, control unit 112, and power converter 108 may be similar or the same as the characteristics and functions of, respectively, power sources 32 and/or 52, loads 40 and/or 64, control units 42 and/or 62, and power converters 35 and/or 53 of FIGS. 1-2.

In some examples, system 100 may be subject to a fault, such as line-to-line fault 105. Fault 105 may cause fault current, $I_{FAULT}$ 26, to bypass load of HVDC grid 102 and at least partially reduce the load current.

AC power source 120 supplies power to electrical system 100 and HVDC grid 102, e.g. Iout 110. AC power source 120 is a three-phase AC generator and may be powered for example by a gas turbine and in some examples may include an APU. In the example of system 100, AC source 120 is Y-connected with each phase connected to a switch node between pairs of high-side and low-side switches.

Similar to loads 40 and 64 described above in relation to FIGS. 1 and 2, HVDC grid 102 receives power from power converter 108 and may supply a variety of other loads connected to HVDC grid 102. HVDC grid 102 may be installed in a vehicle, such as an aircraft, watercraft, or other type of vehicle (including military vehicles, such as helicopters, tanks, etc.), as well as installed for other applications that support DC loads.

Control unit 112 controls the components of electrical system 100, similar to control units 42 and 62 described above in relation to FIGS. 1 and 2. Control unit 112 may send and receive signals to and from power converter 108 and, in some cases, AC power source 120 and HVDC grid 102. Control unit 112 may send control signals to and receive sensing signals from switches T1-T6 via sense and control lines 114. For example, control unit 112 may control the switching frequency, on-time, duty cycle and other operating characteristics of switches T1-T6 by controlling the voltage applied to the gates of switches T1-T6. Control unit 112 may also sense the status (e.g. on-state or off-state) of each switch, the magnitude of current through each switch, a drain-source voltage ($V_{DS}$), temperature and other sensing signals either directly from switches T1-T6 or from sensing components near switches T1-T6.

Similar to control unit 42 depicted in FIG. 1 and control unit 62 depicted in FIG. 2, control unit 112 may also monitor and control other operating parameters and components of system 100. For example, control unit 112 may monitor the output current ($I_{OUT}$) 110, output voltage and other operating parameters. As one example, power converter 108 may include one or more sensors, such as voltage and/or current sensor 180, which may send signals to control unit 112. Voltage and current sensor 180 may include a voltage divider and a shunt resistor, or some other techniques of measuring voltage and current. System 100 may also include other sensors, not shown in FIG. 3.

Power converter 108 converts power supplied by AC power source 120 to supply the requirements of HVDC grid 102. Power converter 108 is an example implementation of an AC/DC power converter, similar to power converter 53 described above in relation to FIG. 2. Like power converter 53, power converter 108 rectifies and conditions the AC power from AC power source 120 to a DC output power. Power converter 108 includes switches T1-T6.

Switches T1-T6 of power converter 108 are depicted as n-type MOSFETs, with the gate of each MOSFET connected to control unit 112 via sense and control lines 114. For clarity, the connections to the gates of each MOSFET are not shown in FIG. 3. In other examples, switches T1-T6 may also be implemented with any other type of switch, including an IGBT. The drains of high-side switches T1, T3 and T5 connect to a common node 170 that connects to a first terminal of protection device 104. The sources of low-side switches T2, T4 and T6 connect to a common node 172 that also connects to an output terminal of power converter 108. In some examples node 172 may be considered a ground or reference node. The source of high-side switch T1 connects to the drain of low-side switch T2 as well as to the A winding 174 of AC source 120 at switch node A of the pair formed by high-side T1 and low-side switch T2. Current $i_A$ 122 flows to A winding 174 from switch node A. Similarly, the source of high-side switch T3 connects to the drain of low-side switch T4 as well as to the B winding 176 of AC source 120 at switch node B of the pair formed by high-side T3 and low-side switch T4. Current $i_B$ 124 flows to B coil 176 from switch node B. The source of high-side switch T5 connects to the drain of low-side switch T6 as well as to the C winding 178 of AC source 120 at switch node C of the pair formed by high-side T5 and low-side switch T6. Current $i_C$ 126 flows to C coil 178 from switch node C. A winding 174, B winding 176, and C winding 178 may be referenced to phase A, phase B, and phase C, respectively, and each may be 120 degrees out of phase with each other.

Each switch T1-T6 also includes an antiparallel diode 140-152, also referred to as "diodes" 140-152 for brevity, connected in parallel across each switch and having a polarity reversed with respect to each respective switch T1-T6. Specifically, diode D1 connects in parallel with T1 between node 170 and switch node A, diode D3 connects in parallel with T3 between node 170 and switch node B, diode D5 connects in parallel with T5 between node 170 and switch node C, diode D2 connects in parallel with T2 between node 172 and switch node A, diode D4 connects in parallel with T4 between node 172 and switch node B, diode D6 connects in parallel with T6 between node 172 and switch node C.

In operation, system 100 functions the same as systems 10 and 50 described above in relation to FIGS. 1-2. That is, during normal (i.e., no fault) operation system 100 may receive power from AC power source 120, convert the AC power to a predetermined DC voltage and current, and supply the converted power to HVDC grid 102.

During a fault condition, control unit 112 may receive an indication of the fault condition. For example, control unit 112 may receive e.g., from voltage and/or current sensor 180, an indication of a current level flowing out of power converter 108. Control unit 112 may determine that the current level represents a fault condition, e.g. fault 105, such as by determining that the current level indicated by voltage and current sensor 180 exceeds a predetermined acceptable current level associated with power converter 108.

In response to detecting fault 105, control unit 112 may reconfigure components of electrical system 100 to prevent fault 105 from damaging electrical system 100. In particular, control unit 112 may control switches T1-T6 to reduce an amount of fault current $I_{FAULT}$ 26 associated with fault condition 105.

To prevent damage from fault condition 105, control unit 112 may alternately close and open at least one switch T1-T6. By closing at least one switch, control unit 112 may cause at least a portion of fault current 26 to recirculate back through AC power source 120, i.e. as currents $i_A$ 122, $i_B$ 124, and $i_C$ 126, rather than exit power converter 108. In other words, by closing at least one switch and causing some of the fault current to recirculate through AC power source 120, may reduce the magnitude of the remaining fault current flowing as $I_{OUT}$ 110.

For example, control unit 112 may close switch T1 during a negative portion of a current cycle of the phase A current and open switch T1 during a positive portion of the current cycle of the phase A current. Alternately opening and closing switch T1 depending on the positive/negative portion of the phase A current cycle during a fault condition may reduce the magnitude of the recirculation current, $i_A$ 122 and the amount of energy switch T1 is exposed to during the fault condition, e.g., as compared with a "crowbar" technique in which all of switches T1-T6 are closed to reduce $I_{FAULT}$ 26. Reducing the magnitude of the current and amount of energy flowing through switch T1 during a fault condition by alternately closing and opening switch T1 may be illustrated by a comparison with the "crowbar" type concept (e.g., constantly open switches T1-T6), as described with reference to FIGS. 3-6.

FIGS. 4A-6E are described concurrently below with reference to each other and with reference to FIG. 3. FIG. 4A is a plot 400 illustrating example single phase line current of an AC/DC power converter during a fault condition and FIGS. 4B-4E are plots 402-408 illustrating example current flowing through components of an AC/DC power converter during a fault condition. In particular, FIGS. 4B-4E illustrate the current flowing on phase A of power source 120 through switches T1 and T2 and diodes D1 and D2 with a conventional crowbar implemented (e.g., by control unit 112) at the time of a fault, e.g., time 412. FIG. 5A is a plot 500 illustrating example single phase line current of an AC/DC power converter during a fault condition and FIGS. 5B-5E are plots 502-508 illustrating example current flowing through components of an AC/DC power converter during a fault condition with converter switches alternately opened and closed, in accordance with techniques of this disclosure. In particular, FIGS. 5B-5E illustrate the current flowing on phase A of power source 120 through switches T1 and T2 and diodes D1 and D2 while switch T1 is alternately closed and opened based on the AC cycle of the current on phase A being negative or positive, respectively, during fault condition 105, e.g., at time 412.

The technique illustrated in FIGS. 5B-5E may be referred to as a "half crowbar" technique, alluding to implementation of a crowbar type concept during only half of a current cycle. FIG. 6A is a plot 600 illustrating example single phase line current of an AC/DC power converter during a fault condition and FIGS. 6B-6E are plots 602-608 illustrating example current flowing through components of an AC/DC power converter during a fault condition with groups of converter switches alternately opened and closed, in accordance with techniques of this disclosure. In particular, FIGS. 6B-6E illustrate the current flowing on phase A of power source 120 through switches T1 and T2 and diodes D1 and D2 while switches T1 and T2 are oppositely closed and opened during fault condition 105, e.g., at time 412. For example, switch T1 may be opened and switch T2 closed for a first predetermined amount of time, and then switch T1 may be closed and switch T2 opened for a second predetermined amount of time after the first predetermined amount of time. The technique illustrated in FIG. 6B-6E may be referred to as a "rotating crowbar" technique, alluding to implementation of a crowbar type concept alternately between high-side switches and low-side switches. In the examples shown in FIGS. 4A-6E, the current flowing on phases B and C of power source 120 are the same as phase A but shifted in phase.

Referring to the examples illustrated in FIGS. 4A-4E, during normal operation (e.g., before a fault at time 412 as shown) switches T1 and T2 may conduct phase A current 414, 416, respectively, having a current amplitude that ranges substantially between −1.0 and +1.0 on the average, e.g., normalized with respect to the average peak-to-valley current during normal, non-faulted operation. After a fault at time 412, controller 112 may interface with switch T1 to cause switch T1 to close per a conventional crowbar and conduct a current that may reach a 4.0 per unit amplitude and an almost 2.5 per unit steady state positive amplitude. Diode D1 may conduct over 1.0 positive per unit current. In other words, when closed, switch T1 may fully conduct the negative phase A current and partially conducts the positive phase A current along with diode D1.

With reference to FIGS. 3-4E, controller 112 may interface with each of switches T1-T6 to cause all of switches T1-T6 to close at time 412, e.g., upon determination of fault 105 to implement a conventional crowbar on all three phases A-C. The current of each of the three phases A-C may then flow via the low impedance path through one or more of switches T1-T6, rather than the higher impedance fault path 105. Closing each of switches T1-T6 effectively causes AC source 120 to be symmetrically faulted, and a current that is four times the output current (e.g., the output current before time 412) may flow through power switches T1, T3, T5 and diodes D1, D3, and D5, illustrated for T1 and D1 as the per unit current in FIGS. 4B and 4C, respectively. Additionally, as illustrated in FIGS. 4B-4E, the current may be concentrated of the high-side switch T1 and diode D1 during implementation of the conventional crowbar during the fault condition, while low-side switch T2 and D2 do not participate in fault current conduction. In other words, the current may be concentrated on high-side power switches T1, T3, T5 and diodes D1, D3, and D5, representing 50% of the copper base of the power converter 120, while switches T2, T4, T6 and diodes D2, D4, D6 do not participate in fault current conduction. Consequently, at least some of, or all of, the switches and diodes, e.g., T1, T3, T5 and diodes D1, D3, and D5 may be over-sized by more than 200% to conduct the fault current without exceeding safety junction temperatures.

With reference to FIGS. 3 and 5A-5E and in accordance with various aspects of the techniques described in this disclosure, at time 412 upon determination of fault 105, controller 112 may cause high-side switches T1, T3, and T5 to alternately open and close based on whether the current is positive or negative during its AC cycle, while causing low-side switches T2, T4, and T6 to open and remain open, e.g., remain in an off state and not conducting current. For example, when the phase A current flows to the machine side (e.g., a negative current), controller 112 may cause switch T1 to close, and when the phase A current flows towards HVDC grid 102 (e.g., a positive current) controller 112 may cause switch T1 to open, while causing switch T2 to remain open during the entire current cycle. By closing switch T1 only during negative phase A current, diode D1 is forced to fully conduct the positive phase current while switch T1 is open, which switch T1 would otherwise conduct if closed during the positive portion of the current cycle due to the lower impedance of switch T1 relative to diode D1. In some examples, during the negative portion of the phase A current cycle, the low-side switches T2 and diode D2 may also participate in the fault current conduction. The current distribution in switches T1 and T2 and diodes D1 and D2 may depend on the MOSFET on-state resistance and the fault impedance. In some examples, switch T1 may have a switching current rating less than that of diode D1, and this "half crowbar" concept illustrated in FIGS. 5A-5E in accordance with various aspects of the techniques described in this disclosure may increase the fault handling capability of power converter as compared to a conventional crowbar. In some examples, switch T1 may only conduct current during the half cycle during which diodes D1 and D2 cannot conduct the current, which may reduce the RMS current and hence reduce the junction temperature of switch T1.

Similarly, at time 412 upon determination of fault 105, controller 112 may cause switch T3 close when the phase B current of each switch flows to the machine side, and to cause switch T3 to open when the phase B current flows to HVDC grid 102 and fault 105, while causing switch T4 to remain open during the entire current cycle. Additionally, at time 412 upon determination of fault 105, controller 112 may cause switch T5 to close when the phase C current of each switch flows to the machine side and to cause switch T5 to open when the phase C current flows to HVDC grid 102 and fault 105, while causing switch T6 to remain open during the entire current cycle.

As discussed above, one advantage of a half-crowbar concept as described above may include reduced weight when compared with other types of protection devices. In the example of system 100 installed on an aircraft, weight savings may have a positive "snowball effect". For example, saving weight in the installed equipment may lead to a possible weight reduction of the aircraft structure and the engine. In other words, by reducing the equipment weight, the structure needed to support the equipment, and the engine power needed to fly the aircraft may also be reduced. That is, a kilogram of equipment weight savings may result in more than a kilogram of weight savings for the entire vehicle, which may result in lower fuel consumption and an improved performance.

With reference to FIGS. 3 and 6A-6E and in accordance with various aspects of the techniques described in this disclosure, at time 412 upon determination of fault 105, controller 112 may cause high-side switch T1 and low-side switch T2 to be alternately and oppositely opened and closed during fault condition 105. For example, controller 112 may cause switch T1 to open and switch T2 to close for a first predetermined amount of time 614, and then cause switch T1 to close and switch T2 to open for a second predetermined amount of time 616 after the first predetermined amount of time 614. By oppositely closing and opening high-side switch T1 and low-side switch T2, losses may be reduced in both switches T1 and T2 and the conduction of the fault current is more evenly distributed between switches both T1 and T2 and diodes D1 and D2.

For example, by closing switch T1 and opening switch T2 for one or more AC cycles, switch T1 and diode D1 are forced to conduct the fault current for those one or more AC cycles 614. Then, by opening switch T1 and closing switch T2 for one or more subsequent AC cycles, switch T2 and diode D2 are forced to conduct the fault current for those one or more subsequent AC cycles 616. In the example shown, switch T1 and diode D1 do not conduct any fault current during fault condition 105 for first predetermined amount of time 614 while switch T2 and diode D2 conduct the fault current, and switch T2 and diode D2 do not conduct any fault current during fault condition 105 for second predetermined amount of time 616 while switch T1 and diode D1 conduct the fault current.

Similarly, at time 412 upon determination of fault 105, controller 112 may cause switches T3 and T4 of phase B and switches T5 and T6 of phase C to alternately and oppositely open and close during fault condition 105 similar to as described above for switches T1 and T2 of phase A.

As discussed above, one advantage of a rotating crowbar concept as described above may include reduced weight when compared with other types of protection devices. As with the half-crowbar technique, in the example of system 100 installed on an aircraft, the weight savings of a system implementing a rotating crowbar technique may have a positive "snowball effect". For example, saving weight in the installed equipment may lead to a possible weight reduction of the aircraft structure and the engine. In other words, by reducing the equipment weight, the structure needed to support the equipment, and the engine power needed to fly the aircraft may also be reduced. That is, a kilogram of equipment weight savings may result in more than a kilogram of weight savings for the entire vehicle, which may result in lower fuel consumption and an improved performance.

Figure 7:
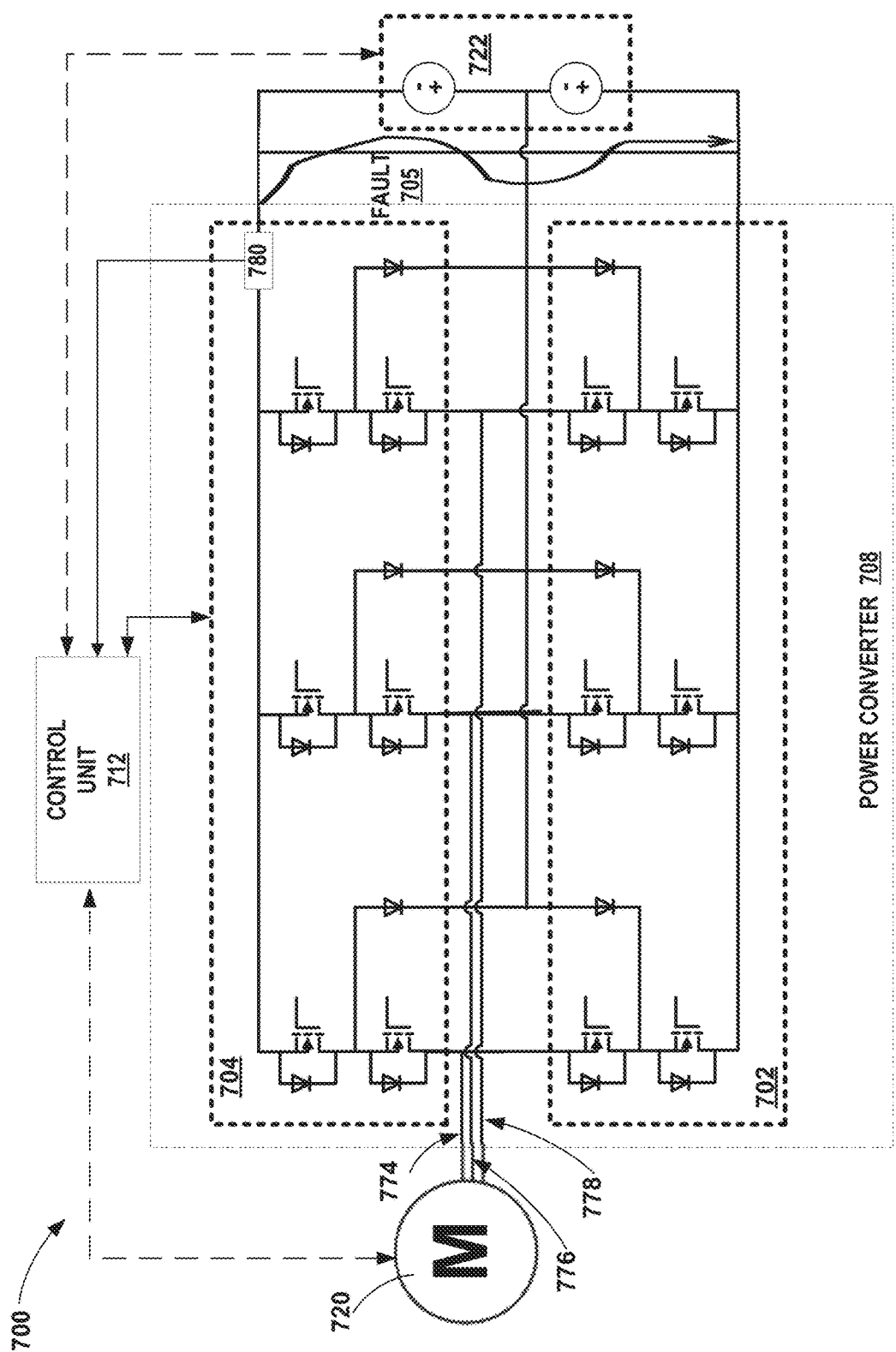
FIG. 7 is a block diagram illustrating an additional example electrical system with an AC/DC power converter configured to implement fault protection, in accordance with techniques of this disclosure.

FIG. 7 is a block diagram illustrating an additional example electrical system 700 with an AC/DC power converter configured to implement fault protection, in accordance with techniques of this disclosure. Electrical system 700 (referred to as system 700) operates in a similar manner to systems 10, 50, and 100 described above in relation to FIGS. 1 and 2. In some examples, system 700 may be a multi-level power conversion system, such as a neutral point clamped (NPC) power converter or a flying capacitor multi-level power converter, or higher level multi-level power converter. System 700 is just one possible example implementation of an AC/DC power converter circuit supplying a load. In other examples, AC/DC power converters may include different components and configurations and remain within the scope of this disclosure.

In the example shown, system 100 includes AC power source 720, control unit 712, electrical load 722, and power converter 708 which may include high-side switches 702 and low-side switches 704. AC power source 720, load 722, control unit 712, and power converter 708, are, respectively, examples of power sources 120, 32 and/or 52, HVDC grid 102 and/or loads 40 and 64, control units 112, 42 and/or 62, and power converters 108, 35 and/or 53 of FIGS. 1-3, and as such may be similar or the same as the characteristics and functions of, respectively, power sources 120, 32 and/or 52, HVDC grid 102 and/or loads 40 and 64, control units 112, 42 and/or 62, and power converters 108, 35 and/or 53 of FIGS. 1-3.

Power converter 708 may be a multi-level power converter configured to generate high-voltage wave forms from lower-voltage components. In the example shown, each of high-side switches 702 and low-side switches 704 include two switch/diode pairs for each phase 774-778 of AC source 720. Control unit 712 may be configured to control high-side switches and low-side switches to convert AC current on the three phases 774-778 from AC source 720 to multiple DC current levels and may determine the DC voltage and/or current level via voltage and/or current sensor 780.

In response to detecting fault 705, control unit 712 may reconfigure components of electrical system 700 to prevent fault 705 from damaging electrical system 700. In particular, control unit 712 may control one or more switches 702, 704 to close during a negative current portion of an AC cycle and open during a positive current portion of the AC cycle, e.g., to implement a "half crowbar" technique as described above. Control unit 712 may control one or more high-side switches 702 to close and one or more low-side switches 704 to close for a first amount of time, and open the one or more high-side switches 702 and close the one or more low-side switches 704 to for a second amount of time, where the first and second amounts of time occur during different periods of time, e.g., to implement a "rotating crowbar" technique as described above. Control unit 712 may control one or more switches 702, 704 to implement both a half-crowbar and a rotating crowbar concurrently and/or combined, e.g., to manage a low impedance fault.

Figure 8:
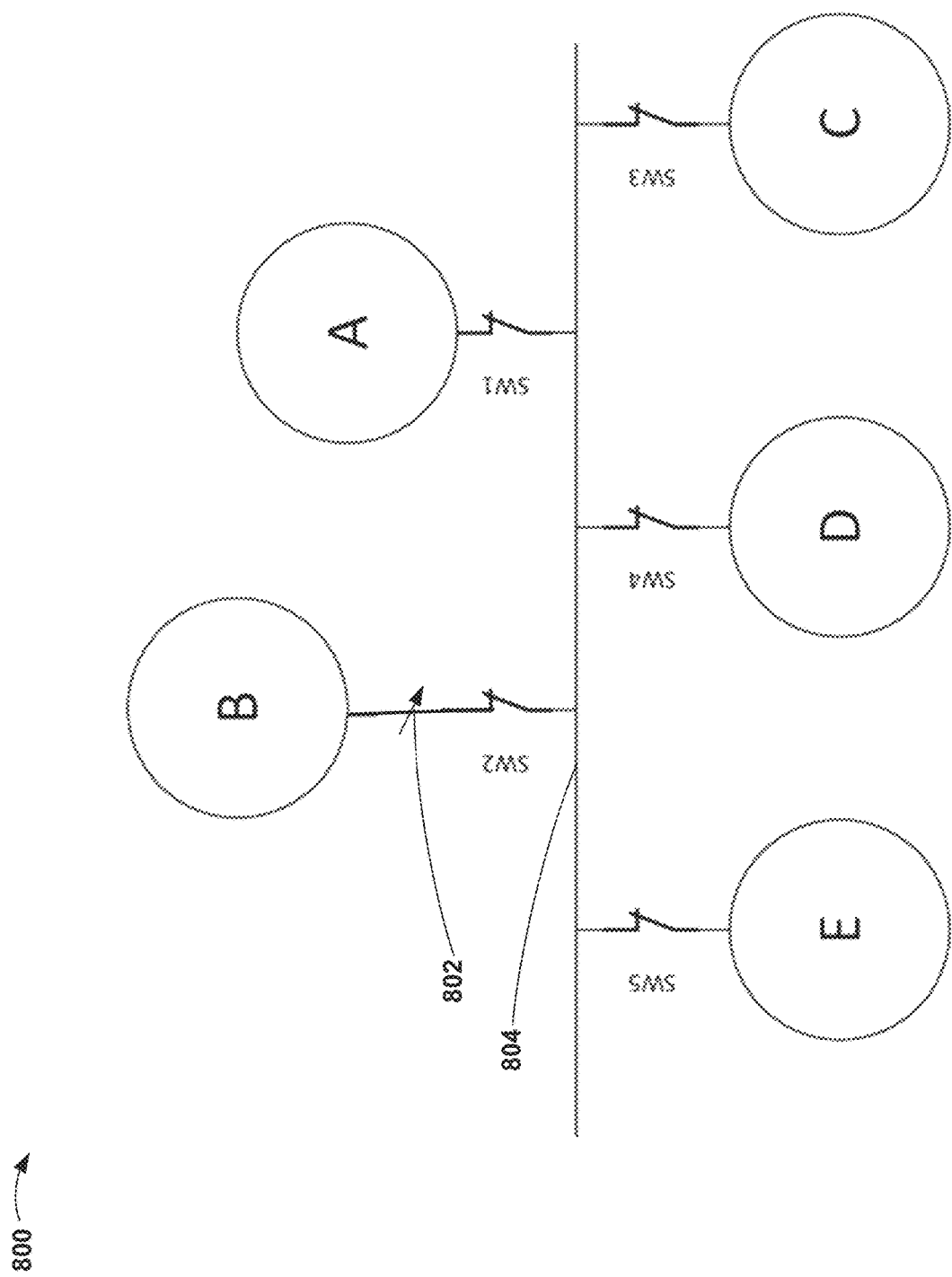
FIG. 8 is a block diagram illustrating an example DC distribution system including one or more AC/DC power converters configured to implement fault protection, in accordance with techniques of this disclosure.

FIG. 8 is a block diagram illustrating an example DC distribution system 800 including one or more AC/DC power converters configured to implement fault protection, in accordance with techniques of this disclosure. In the example shown, system 800 includes power conversion systems A, B, C, D, and E all connected to DC distribution bus 804 via contactors SW1, SW2, SW3, SW4, and SW5, respectively. Each of power conversion systems A-E may be an example of, and operate in a similar manner to, any of systems 10, 50, 100, or 700 described above in relation to FIGS. 1-3, 7. For example, any or all of power conversion systems A-E may be include a single-level or multi-level power converter configured to implement a half-crowbar, rotating-crowbar, or combination thereof, alone or in any combination.

In the example shown, a low-impedance short-circuit fault 802 is located at or near power conversion system B. Power conversion systems A, C-E may continue to provide DC current to the bus, and the fault current in contactors SW1-SW5 may exceed each contactors' break current limit and cause contactor welding. In some examples, each of power conversion systems A-E may be configured to implement a half-crowbar, rotating-crowbar, or both combined to significantly reduce the fault current conducting through contactors SW1-SW5. In some examples, smaller and less costly contactors may be used for a system 800 in which one or more of power conversion systems A-E implement a half-crowbar, rotating-crowbar, or both combined according to the techniques of this disclosure.

Figure 9:
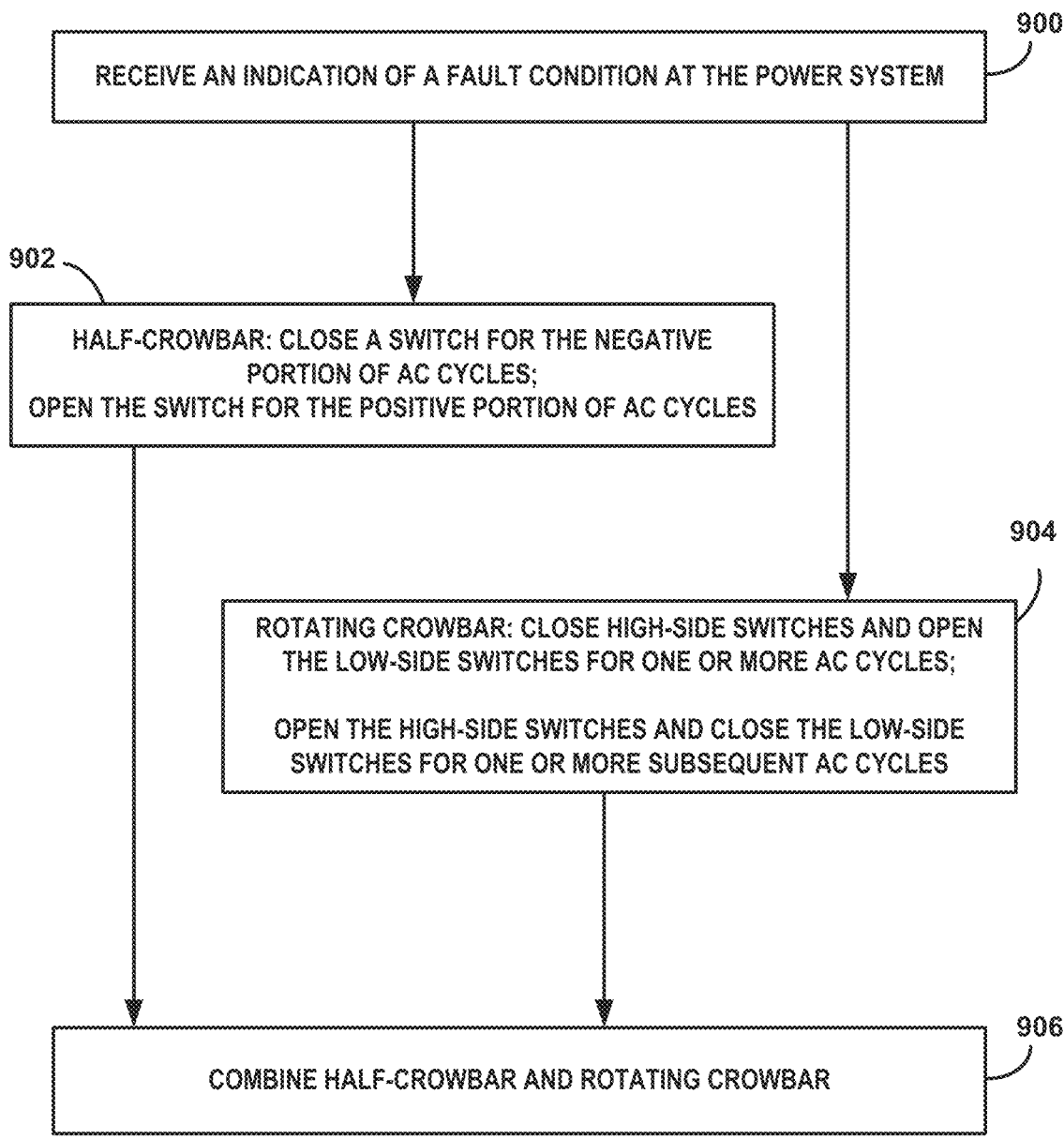
FIG. 9 is a flowchart of an example method of protecting a power conversion system during a short circuit fault, in accordance with examples of the present disclosure.

FIG. 9 is a flowchart of an example method of protecting a power conversion system during a short circuit fault, in accordance with examples of the present disclosure. Although described with reference to system 100 and FIG. 3, the method shown may be used with any suitable power conversion system, e.g., systems 10, 50, 100, 700, or 800.

A control unit, e.g., control unit 112, may receive an indication of a short-circuit fault condition 105, e.g., via voltage and/or current sensor 80 (900). In response to the short-circuit fault condition, control unit 112 may close one or more switches T1-T6 connected to respective phases of a polyphase alternating current (AC) power source 120 during a negative current portion of the AC cycles of each respective phase, and open one or more switches T1-T6 during a positive current portion of the AC cycles of each respective phase, e.g., to implement a half-crowbar technique (902).

Alternatively, control unit 112 may, in response to the short-circuit fault condition, close one or more of high-side switches T1, T3, and T5 and open one or more low-side switches T2, T4, and T6 for one or more AC cycles of each respective phase, e.g., a first amount of time. Control unit 112 may then open one or more of high-side switches T1, T3, and T5 and close one or more low-side switches T2, T4, and T6 for one or more subsequent AC cycles of each respective phase, e.g., a second amount of time subsequent to the first amount of time (904), e.g., to implement a rotating-crowbar technique.

Control unit 112 may, in response to the short-circuit fault condition, close one or more high-side switches T1, T3, and T5 connected to respective phases of a polyphase alternating current (AC) power source 120 during a negative current portion of the AC cycles of each respective phase, and open one or more high-side switches T1, T3, and T5 during a positive current portion of the AC cycles of each respective phase for one or more AC cycles, e.g., a first amount of time. Concurrently during the first amount of time. Control unit 112 may open one or more low-side switches T2, T4, and T6. Subsequently, for a second amount of time, e.g., one or more AC cycles, control unit may open high-side switches T1, T3, and T5 while closing one or more of low-side switches T2, T4, and T6 during a negative current portion of the AC cycles of each respective phase and opening one or more of low-side switches T2, T4, and T6 during a positive current portion of the AC cycles of each respective phase, e.g., to implement a combined half-crowbar and rotating crow-bar technique (906).

In one or more examples, the functions described above may be implemented in hardware, software, firmware, or any combination thereof. For example, control unit 42 in FIG. 1 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, may comprise RAM, ROM, EEPROM, or any other medium that can be used to store desired program code in the form of instructions or data structures and that can be accessed by a computer. Also, any connection is properly termed a computer-readable medium. For example, if instructions are transmitted from a website, server, testing equipment or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as described above in relation to FIG. 1. Accordingly, the term "processor," as used herein, such as a processor included in control unit 42, may refer to any of the foregoing structure or any other structure suitable for implementation of the techniques described herein. In addition, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The techniques of this disclosure may also be described in the following examples.

Example 1: A power conversion system includes a first switch configured to be connected between a first phase of a polyphase alternating current (AC) power source and an electrical load; a first diode configured to be connected between the first phase of the polyphase AC power source and the electrical load, wherein the diode is configured to conduct a current from the first phase of the polyphase AC power source to the electrical load; and a control unit configured to interface with the first switch to close, responsive to the occurrence of a short circuit fault, the first switch during a negative current portion of the AC cycle of the first phase of the polyphase AC power source and open, responsive to the occurrence of the short circuit fault, the first switch during a positive current portion of the AC cycle of the first phase of the polyphase AC power source.

Example 2: The power conversion system of example 1, further includes a second switch configured to be connected between a second phase of the polyphase AC power source and the electrical load; a second diode configured to be connected between the second phase of the polyphase AC power source and the electrical load, wherein the diode is configured to conduct a current from the second phase of the polyphase AC power source to the electrical load; a third switch configured to be connected between a third phase of the polyphase AC power source and the electrical load; and a third diode configured to be connected between the third phase of the polyphase AC power source and the electrical load, wherein the diode is configured to conduct a current from the third phase of the polyphase AC power source to the electrical load, wherein the control unit is configured to interface with the second switch to close, responsive to the occurrence of the short circuit fault, the second switch during a negative current portion of the AC cycle of the second phase of the polyphase AC power source and open, responsive to the occurrence of the short circuit fault, the second switch during a positive current portion of the AC cycle of the second phase of the polyphase AC power source, wherein the control unit is configured to interface with the third switch to close, responsive to the occurrence of the short circuit fault, the third switch during a negative current portion of the AC cycle of the third phase of the polyphase AC power source and open, responsive to the occurrence of the short circuit fault, the third switch during a positive current portion of the AC cycle of the third phase of the polyphase AC power source.

Example 3: The power conversion system of example 2, wherein each of the first, second, and third phases of the polyphase AC power source are configured to output AC that is 120 degrees out of phase with each of the other phases.

Example 4: The power conversion system of example 3, wherein each of the first, second, and third switches and each of the first, second, and third diodes are configured to be high-side connected between the polyphase AC power source and the electrical load.

Example 5: The power conversion system of example 1, further includes a first low-side switch configured to be connected between the first phase of the polyphase AC power source and the electrical load; and a first low-side diode configured to be connected between the first phase of the polyphase AC power source and the electrical load, wherein the diode is configured to conduct a current from the electrical load to the first phase of the polyphase AC power source, wherein the control unit configured to interface with the first switch to, responsive to the occurrence of the short circuit fault, close the first switch and open the first low-side switch for a first amount of time and open the first switch and close the first low-side switch for a second amount of time, wherein the first and second amounts of time occur during different periods of time.

Example 6: The power conversion system of example 5, wherein the first and second amounts of time comprise at least one AC cycle of the first phase of the polyphase AC power source.

Example 7: The power conversion system of example 6, wherein the control unit configured to interface with the first switch to close, responsive to the occurrence of the short circuit fault, the first switch during a negative current portion of the AC cycle of the first phase of the polyphase AC power source and open, responsive to the occurrence of the short circuit fault, the first switch during a positive current portion of the AC cycle of the first phase of the polyphase AC power source during the first amount of time, wherein the control unit configured to interface with the first low-side switch to close, responsive to the occurrence of the short circuit fault, the first low-side switch during a negative current portion of the AC cycle of the first phase of the polyphase AC power source and open, responsive to the occurrence of the short circuit fault, the first low-side switch during a positive current portion of the AC cycle of the first phase of the polyphase AC power source during the second amount of time.

Example 8: The power conversion system of example 1, wherein the first switch is a metal oxide silicon field effect transistor (MOSFET).

Example 9: The power conversion system of example 1, wherein the power conversion system is a multi-level power conversion system configured to generate high-voltage wave forms from lower-voltage components.

Example 10: The power conversion system of example 1, wherein the power conversion system is a neutral point clamped power conversion system.

Example 11: A method of protecting a power conversion system during a short circuit fault includes closing, via a control unit and in response to the short circuit, a first switch connected to a first phase of a polyphase alternating current (AC) power source during a negative current portion of an AC cycle of the first phase of the polyphase AC power source; and opening, via the control unit and in response to the short circuit, the first switch during a positive current portion of the AC cycle of the first phase of the polyphase AC power source.

Example 12: The method of example 11, further includes closing, via a control unit and in response to the short circuit, a second switch connected to a second phase of the polyphase AC power source during a negative current portion of an AC cycle of the second phase of the polyphase AC power source; and opening, via the control unit and in response to the short circuit, the second switch during a positive current portion of the AC cycle of the second phase of the polyphase AC power source; closing, via a control unit and in response to the short circuit, a third switch connected to a third phase of the polyphase AC power source during a negative current portion of an AC cycle of the third phase of the polyphase AC power source; and opening, via the control unit and in response to the short circuit, the third switch during a positive current portion of the AC cycle of the third phase of the polyphase AC power source.

Example 13: The method of example 12, wherein each of the first, second, and third phases of the polyphase AC power source output AC that is 120 degrees out of phase with each of the other phases.

Example 14: The method of example 13, wherein each of the first, second, and third switches and each of the first, second, and third diodes are configured to be high-side connected between the polyphase AC power source and the electrical load.

Example 15: The method of example 11, further includes closing, via a control unit and in response to the short circuit, the first switch for a first amount of time; opening, via a control unit and in response to the short circuit, a first low-side switch for the first amount of time; opening, via a control unit and in response to the short circuit, the first switch for a second amount of time; and closing, via a control unit and in response to the short circuit, the first low-side switch for the second amount of time, wherein the first and second amounts of time occur during different periods of time.

Example 16: The method of example 15, wherein the first and second amounts of time comprise at least one AC cycle of the first phase of the polyphase AC power source.

Example 17: The method of example 16, further includes closing, via a control unit and in response to the short circuit, the first switch during the negative current portion of the AC cycle of the first phase of the polyphase AC power source and during the first amount of time; opening, via the control unit and in response to the short circuit, the first switch during the positive current portion of the AC cycle of the first phase of the polyphase AC power source and during the first amount of time; closing, via a control unit and in response to the short circuit, the first low-side switch during the negative current portion of the AC cycle of the first phase of the polyphase AC power source and during the second amount of time; and opening, via the control unit and in response to the short circuit, the first low-side switch during the positive current portion of the AC cycle of the first phase of the polyphase AC power source and during the second amount of time.

Example 18: The method of example 11, wherein the first switch is a metal oxide silicon field effect transistor (MOSFET).

Example 19: The method of example 11, wherein the power conversion system is a multi-level power conversion system configured to generate high-voltage wave forms from lower-voltage components.

Example 20: A direct current (DC) distribution system includes a first power conversion system includes a first alternating current (AC) power source; a first set of switches configured to be connected between the first AC power source and a DC distribution bus; a first set of diodes configured to be connected between the first AC power source and the DC distribution bus, wherein the diode is configured to conduct a current from the first AC power source to the DC distribution bus; and a first control unit configured to interface with the first set of switches to close, responsive to the occurrence of a short circuit fault, the first set of switches during a negative current portion of an AC cycle of the first AC power source and open, responsive to the occurrence of the short circuit fault, the first set of switches during a positive current portion of the AC cycle of the first AC power source; and a second power conversion system includes a second alternating current (AC) power source; a second set of switches configured to be connected between the second AC power source and the DC distribution bus; a second set of diodes configured to be connected between the second AC power source and the DC distribution bus, wherein the diode is configured to conduct a current from the second AC power source to the DC distribution bus; and a second control unit configured to interface with the second set of switches to open and close the second set of switches.

The invention claimed is:

1. A power conversion system comprising:
a first switch configured to be connected between a first phase of a polyphase alternating current (AC) power source and an electrical load;
a first diode configured to be connected between the first phase of the polyphase AC power source and the electrical load, wherein the diode is configured to conduct a current from the first phase of the polyphase AC power source to the electrical load; and
a control unit configured to interface with the first switch to close, responsive to the occurrence of a short circuit fault, the first switch during a negative current portion of the AC cycle of the first phase of the polyphase AC power source and open, responsive to the occurrence of the short circuit fault, the first switch during a positive current portion of the AC cycle of the first phase of the polyphase AC power source.

2. The power conversion system of claim 1, further comprising:
a second switch configured to be connected between a second phase of the polyphase AC power source and the electrical load;
a second diode configured to be connected between the second phase of the polyphase AC power source and the electrical load, wherein the diode is configured to conduct a current from the second phase of the polyphase AC power source to the electrical load;
a third switch configured to be connected between a third phase of the polyphase AC power source and the electrical load; and
a third diode configured to be connected between the third phase of the polyphase AC power source and the electrical load, wherein the diode is configured to conduct a current from the third phase of the polyphase AC power source to the electrical load,
wherein the control unit is configured to interface with the second switch to close, responsive to the occurrence of the short circuit fault, the second switch during a negative current portion of the AC cycle of the second phase of the polyphase AC power source and open, responsive to the occurrence of the short circuit fault, the second switch during a positive current portion of the AC cycle of the second phase of the polyphase AC power source,
wherein the control unit is configured to interface with the third switch to close, responsive to the occurrence of the short circuit fault, the third switch during a negative current portion of the AC cycle of the third phase of the polyphase AC power source and open, responsive to the occurrence of the short circuit fault, the third switch during a positive current portion of the AC cycle of the third phase of the polyphase AC power source.

3. The power conversion system of claim 2, wherein each of the first, second, and third phases of the polyphase AC power source are configured to output AC that is 120 degrees out of phase with each of the other phases.

4. The power conversion system of claim 3, wherein each of the first, second, and third switches and each of the first, second, and third diodes are configured to be high-side connected between the polyphase AC power source and the electrical load.

5. The power conversion system of claim 1, further comprising:
a first low-side switch configured to be connected between the first phase of the polyphase AC power source and the electrical load; and
a first low-side diode configured to be connected between the first phase of the polyphase AC power source and the electrical load, wherein the diode is configured to conduct a current from the electrical load to the first phase of the polyphase AC power source,
wherein the control unit configured to interface with the first switch to, responsive to the occurrence of the short circuit fault, close the first switch and open the first low-side switch for a first amount of time and open the first switch and close the first low-side switch for a second amount of time, wherein the first and second amounts of time occur during different periods of time.

6. The power conversion system of claim 5, wherein the first and second amounts of time comprise at least one AC cycle of the first phase of the polyphase AC power source.

7. The power conversion system of claim 6, wherein the control unit configured to interface with the first switch to close, responsive to the occurrence of the short circuit fault, the first switch during a negative current portion of the AC cycle of the first phase of the polyphase AC power source and open, responsive to the occurrence of the short circuit fault, the first switch during a positive current portion of the AC cycle of the first phase of the polyphase AC power source during the first amount of time,
  wherein the control unit configured to interface with the first low-side switch to close, responsive to the occurrence of the short circuit fault, the first low-side switch during a negative current portion of the AC cycle of the first phase of the polyphase AC power source and open, responsive to the occurrence of the short circuit fault, the first low-side switch during a positive current portion of the AC cycle of the first phase of the polyphase AC power source during the second amount of time.

8. The power conversion system of claim 1, wherein the first switch is a metal oxide silicon field effect transistor (MOSFET).

9. The power conversion system of claim 1, wherein the power conversion system is a multi-level power conversion system configured to generate high-voltage wave forms from lower-voltage components.

10. The power conversion system of claim 1, wherein the power conversion system is a neutral point clamped power conversion system.

11. A method of protecting a power conversion system during a short circuit fault, the method comprising:
  closing, via a control unit and in response to the short circuit, a first switch connected to a first phase of a polyphase alternating current (AC) power source during a negative current portion of an AC cycle of the first phase of the polyphase AC power source; and
  opening, via the control unit and in response to the short circuit, the first switch during a positive current portion of the AC cycle of the first phase of the polyphase AC power source.

12. The method of claim 11, further comprising:
  closing, via a control unit and in response to the short circuit, a second switch connected to a second phase of the polyphase AC power source during a negative current portion of an AC cycle of the second phase of the polyphase AC power source; and
  opening, via the control unit and in response to the short circuit, the second switch during a positive current portion of the AC cycle of the second phase of the polyphase AC power source;
  closing, via a control unit and in response to the short circuit, a third switch connected to a third phase of the polyphase AC power source during a negative current portion of an AC cycle of the third phase of the polyphase AC power source; and
  opening, via the control unit and in response to the short circuit, the third switch during a positive current portion of the AC cycle of the third phase of the polyphase AC power source.

13. The method of claim 12, wherein each of the first, second, and third phases of the polyphase AC power source output AC that is 120 degrees out of phase with each of the other phases.

14. The method of claim 13, wherein each of the first, second, and third switches and each of the first, second, and third diodes are configured to be high-side connected between the polyphase AC power source and the electrical load.

15. The method of claim 11, further comprising:
  closing, via a control unit and in response to the short circuit, the first switch for a first amount of time;
  opening, via a control unit and in response to the short circuit, a first low-side switch for the first amount of time;
  opening, via a control unit and in response to the short circuit, the first switch for a second amount of time; and
  closing, via a control unit and in response to the short circuit, the first low-side switch for the second amount of time,
  wherein the first and second amounts of time occur during different periods of time.

16. The method of claim 15, wherein the first and second amounts of time comprise at least one AC cycle of the first phase of the polyphase AC power source.

17. The method of claim 16, further comprising:
  closing, via a control unit and in response to the short circuit, the first switch during the negative current portion of the AC cycle of the first phase of the polyphase AC power source and during the first amount of time;
  opening, via the control unit and in response to the short circuit, the first switch during the positive current portion of the AC cycle of the first phase of the polyphase AC power source and during the first amount of time;
  closing, via a control unit and in response to the short circuit, the first low-side switch during the negative current portion of the AC cycle of the first phase of the polyphase AC power source and during the second amount of time; and
  opening, via the control unit and in response to the short circuit, the first low-side switch during the positive current portion of the AC cycle of the first phase of the polyphase AC power source and during the second amount of time.

18. The method of claim 11, wherein the first switch is a metal oxide silicon field effect transistor (MOSFET).

19. The method of claim 11, wherein the power conversion system is a multi-level power conversion system configured to generate high-voltage wave forms from lower-voltage components.

20. A direct current (DC) distribution system comprising:
  a first power conversion system comprising:
    a first alternating current (AC) power source;
    a first set of switches configured to be connected between the first AC power source and a DC distribution bus;
    a first set of diodes configured to be connected between the first AC power source and the DC distribution bus, wherein each diode of the first set of diodes is configured to conduct a current from the first AC power source to the DC distribution bus; and
    a first control unit configured to interface with the first set of switches to close, responsive to the occurrence of a short circuit fault, the first set of switches during a negative current portion of an AC cycle of the first AC power source and open, responsive to the occurrence of the short circuit fault, the first set of switches during a positive current portion of the AC cycle of the first AC power source; and a second power conversion system comprising:
- a second alternating current (AC) power source;
- a second set of switches configured to be connected between the second AC power source and the DC distribution bus;
- a second set of diodes configured to be connected between the second AC power source and the DC distribution bus, wherein each diode of the second set of diodes is configured to conduct a current from the second AC power source to the DC distribution bus; and
- a second control unit configured to interface with the second set of switches to open and close the second set of switches.

* * * * *